US005189692A

United States Patent [19]
Ferrara

[11] Patent Number: 5,189,692
[45] Date of Patent: Feb. 23, 1993

[54] TELEPHONE OPERATOR SIMULATOR

[76] Inventor: George Ferrara, 8213 E. LaJunta Rd., Scottsdale, Ariz. 85255

[21] Appl. No.: 691,819

[22] Filed: Apr. 26, 1991

[51] Int. Cl.⁵ ............................................. H04M 1/64
[52] U.S. Cl. ......................................... 379/8.8; 379/67; 379/213; 379/214
[58] Field of Search ..................... 379/67, 88, 79, 87, 379/213, 214, 265, 266, 89, 210, 230, 80, 84

[56] References Cited

U.S. PATENT DOCUMENTS

| | | | |
|---|---|---|---|
| 3,943,290 | 3/1976 | Golden | 379/81 |
| 4,266,098 | 5/1981 | Novak | 379/199 |
| 4,328,396 | 5/1982 | Theis | |
| 4,517,410 | 5/1985 | Williams et al. | |
| 4,677,657 | 6/1987 | Nagata et al. | |
| 4,697,282 | 9/1987 | Winter et al. | 379/67 |
| 4,701,950 | 10/1987 | Curtin et al. | 379/213 |
| 4,734,930 | 3/1988 | Quiros et al. | |
| 4,757,267 | 7/1988 | Riskin | 379/97 |
| 4,811,382 | 3/1989 | Slevi | 379/67 |
| 4,813,070 | 3/1989 | Humphreys et al. | 379/88 |
| 4,866,755 | 9/1989 | Hashimoto | |
| 4,918,322 | 4/1990 | Winter et al. | 379/214 |
| 4,939,771 | 7/1990 | Brown et al. | |
| 4,941,167 | 7/1990 | Cannalte et al. | |

Primary Examiner—Jin F. Ng
Assistant Examiner—Huyen D. Le
Attorney, Agent, or Firm—LaValle D. Ptak

[57] ABSTRACT

A telephone operator simulator system comprises a desk top device connected to a telephone line and which is enabled for operation by the detection of a ringing signal on the line. The system includes a keypad which is selectively operated by the user to cause the system to "answer" the phone by supplying a prerecorded synthesized voice message over the line. This message is followed by the production of a suitable synthesized background sound during the time the calling party states his or her request. The user then operates another key on the keypad, and the same synthesized voice provides a second message, and places the calling party on hold. The user then uses any conventional phone connected to the same line to communicate with the calling party. When this second phone is placed "off-hook", the operator simulator system is turned off or disabled, and a normal telephone conversation takes place between the user and the calling party.

8 Claims, 1 Drawing Sheet

TELEPHONE OPERATOR SIMULATOR

DISCLOSURE DOCUMENT

This application is based on Disclosure Document No. 263,283 filed in the United States Patent Office on Sep. 24, 1990.

BACKGROUND

Automatic and semi-automatic systems have been developed for interfacing with telephone lines to assist both called and calling parties in the exchange of information. One of the most basic systems is a "telephone answering machine" in which an automatic machine continuously monitors the incoming telephone line. When a ring signal is detected, the system causes the called party telephone to go "off-hook", and a pre-recorded short message (the answer) usually is played from an endless tape, to provide the calling party with a message. At the sound of a tone, the calling party is invited to leave a message, which then is recorded on another tape in the machine. The user of such an answering machine then may play back the messages which have accumulated over the period of time the machine has been operated.

Currently, a number of large corporations provide for automated answering systems which function somewhat in the manner of the more simple "answering machines" described above. These automated systems provide the calling party with an initial message, and then, typically, invite the calling party to depress selected ones of the push buttons on a touch-tone telephone to direct the call to specific departments, or the like, where the telephone is answered by a person most likely to be able to communicate with the calling party in the area of interest. These systems essentially operate under the direction of the calling party, who provides tones in response to the recorded prompt, for directing the call to the telephone which ultimately is to be answered in person. Patents directed to this kind of a system are the patents to Williams et al U.S. Pat. No. 4,517,410; Winter et al U.S. Pat. No. 4,918,322; and Brown et al U.S. Pat. No. 4,939,771.

Other systems have been designed to relieve telephone operators from the drudgery of repeatedly answering a telephone with the same message. Two patents which disclose the use of a synthesized voice response to the initial call, following which the operator on duty (or any person) proceeds with a "live" interchange with the calling party, are the patents to Winter et al U.S. Pat. No. 4,697,282, and Quiros et al U.S. Pat. No. 4,734,930. The pre-recorded or synthesized voice is the same voice of the operator; so that, theoretically at least, the calling party is not able to detect the difference between the pre-recorded message and the actual live response which subsequently follows.

The called station of Winter has a number of different prerecorded response messages, which are utilized in responding to incoming calls. The operator is on line the entire time, and actually effects the answering of the called party telephone. After the calling party initiates an interchange, the operator selects the desired message response, which is to be retrieved from memory and played back to the calling party. When the calling party speaks again, the operator, who has been on line via a conventional telephone the entire time, proceeds to converse with the caller. The operator, however, is relieved of making the actual initial voice responses, because of the ability to select pre-recorded responses to the initial query from the calling party.

The system disclosed in the Quiros patent is similar to Winter in the overall technique which is employed. As with Winter, the system of Quiros has the operator on line, monitoring the entire call. The initial response, however, is effected by a stored message. There is no operator selectable response message, but only a single pre-recorded message for the initial response to the calling party. The operator then takes over, after this initial response has been made.

Those systems described above, which include an operator on line during the time the pre-recorded messages are being played back over the line, are subject to the disadvantage of picking up extraneous background sounds from the microphone of the operator's telephone. Consequently, if the environment in which the operator or answering party is located is a noisy one, this noise will be transmitted over the phone line, along with the desired message. For a home, or for a business operated out of the home, where distracting background noise, such as the blaring of a television set, crying children, or the like, may exist, the pickup and transmission of background noise by the telephone microphone frequently is undesirable.

Pre-recorded messages, in voices other than the voice of the called party, are available for telephone answering machines and similar devices. Such messages often are used for injecting humor, sophistication through various regional accents, or the like into the answering response. Even when such a pre-recorded message is employed, however, the answering machine still terminates the prerecorded message with the "beep" to be followed by the calling party leaving a message to be recorded.

A telephone answering system for simulating an operator, and which is controlled much in the manner of the operator assist devices described above, has been introduced under the trademark Tele-Receptionist. This system permits a person initially to answer a telephone by pushing a button to play back a pre-recorded message, generally simulating a message of the type normally given by a secretary or receptionist answering the phone. The called party monitors the response, and then has the option of playing back a second pre-recorded message. Following that message, the called party responds "on line" in a normal manner.

It is desirable to provide a telephone operator simulator system which overcomes the disadvantages of the prior art, and which produces a realistic simulation of an operator by means of pre-recorded messages and background signal noises, to permit the called party to select the moment when he or she desires to engage in actual live conversation with the calling party.

SUMMARY OF THE INVENTION

It is an object of the invention to provide an improved telephone operator simulator system.

It is another object of this invention to provide an improved telephone operator simulator system for supplying pre-recorded response messages and sounds to a calling party, under the manual control of the called party.

It is an additional object of this invention to provide an improved telephone operator simulator system which provides the calling party with the illusion of an actual on line operator prior to the time the called party picks up the telephone and engages in conversation.

It is a further object of this invention to provide a telephone operator simulator system which utilizes a called party selection of pre-recorded response messages and sounds to initiate the interchange with the calling party, which is monitored by the called party, and during which no microphone pickup is provided to convey background noise from the called party location to the calling party.

In accordance with a preferred embodiment of this invention, a telephone operator simulator system is used to interface with incoming calls on a telephone line. The system includes a voice and signal storage memory. A control device is connected to the storage memory and the telephone line, to deliver selected response messages from the storage memory to the telephone line. The messages are selected manually by a device, such as a keypad, coupled to the control device, to cause the memory to supply the selected response message from the storage means to the telephone line. A provision is made to permit the called party to monitor the calling party voice and the response messages. A second response message then is selected by the called party, through the selection device, followed by the called party then "picking up" (going "off-hook") a conventional telephone receiver to engage in a normal two-party conversation with the calling party. When the conventional telephone receiver goes "off-hook", a signal is supplied to the control device to disable the control device and the storage means from supplying a further message or signals to the telephone line. The messages stored comprise voice synthesized messages, as well as sound simulations, such as background sounds, intercom ring-backs, and the like. The actuation of each of the selection message means operates to select a voice message response, which automatically is followed by a predetermined signal response (ie. background noise, intercom ring-back, music on hold, or the like).

DETAILED DESCRIPTION

Figure 1:
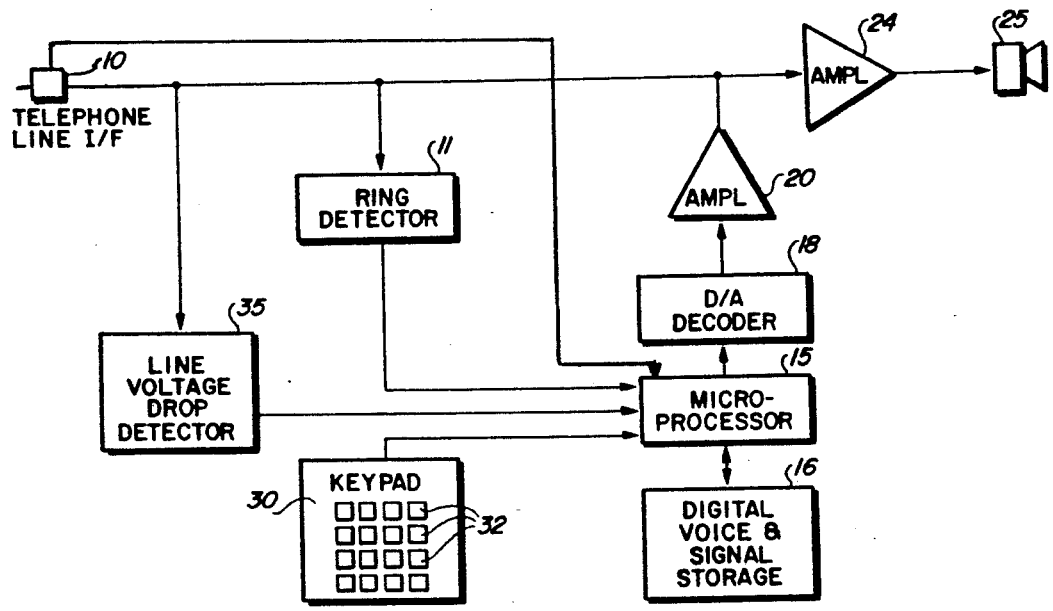
FIG. 1 is a schematic diagram of the preferred embodiment of the invention.

Reference now should be made to the drawing. The system is illustrated as connected to an incoming telephone line. This interconnection is effected through a telephone line interface (I/F) 10, which comprises the usual protection circuitry and line control relays. The system includes a ring detector 11 for responding to the presence of ringing signals on the telephone line. The ring detector 11 produces one of three inputs to a control micro-processor 15, which interfaces to communicate with a digital voice and signal storage read-only memory (ROM) 16.

The storage memory 16 has several address locations in it, in which synthesized voice phrases, or specific response messages, are stored. Examples of such phrases are: "ABC Marketing, may I help you?", or "Thank you, please hold", or "Thank you, I'll connect you with Mr. Jones". In addition, the memory 16 also has digitally synthesized background sounds, of the type which typically exist in the area around a receptionist's desk, such as typewriter noises, air conditioner blowers, or the like. These background sounds are capable of being played back at low volume by the system. In addition, other background sounds, such as a PBX ring-back tone, synthesized music play back, or the like, may be provided for reasons developed more fully in the subsequent description.

The micro-processor 15 supplies address signals to the memory 16, and receives back the synthesized response messages (whether these are short voice messages or background sounds, as described above) which then are supplied to a digital to analog decoder 18, and through an amplifier 20, to the telephone line 10. Consequently, the synthesized response messages and background sounds which are obtained from the storage memory 16 are heard by the calling party on the telephone line 10. These sounds, as well as the voice of the calling party, also are supplied through an amplifier 24 to a loudspeaker 25 to permit the called party to monitor the operation of the system on the line.

In the operation of the system, in response to the detection by the ring detector 11 of a ringing signal on the line, the user is alerted by a ringing signal played back through the loudspeaker. Nothing happens on the telephone line until intervention by the called party takes place. This intervention is effected through a keypad 30 having a number of different keys 32, which are manually operated by the called party. Each of the keys 32 is encoded with a specific address for the memory 16 to access the response messages stored in the memory 16 to be supplied by the microprocessor 15 to the telephone line 10, in the manner described above. The operation of the system is such that the ring detector 11 enables the micro-processor 15 for operation. The called party then depresses the desired one of the keys 32 on the keypad 30. This places the line (I/F) 10 in an "off-hook" condition and sends an encoded address through the microprocessor 15 to the memory 16, to extract the selected response message.

When no further response messages are to be sent by the system, the called party typically picks up the receiver of a standard telephone, which can be located at the same location of the remainder of the system shown in FIG. 1, or at any location which has access to the telephone line 10. When the called party picks up the receiver of this second telephone, a secondary off-hook detector 35 (such as a line voltage drop detector) detects the additional electrical variations present on the line 10 as a result of this second or "extension" telephone going "off-hook" and sends a signal to the microprocessor 15 to disable or "turn off" the operator simulator system which is disclosed in the remainder of FIG. 1. Normal conversation between the called party and the calling party then takes place.

Figure 2:
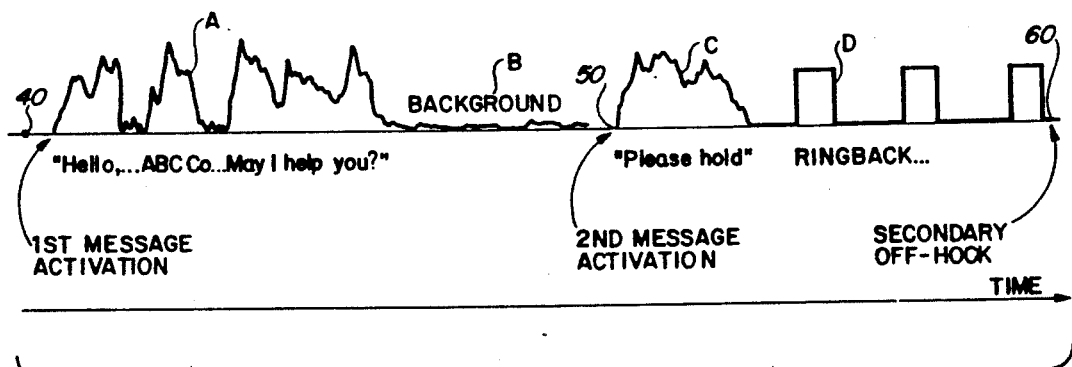
FIG. 2 is a Waveform representation of an operating sequence useful in describing the operation of the system shown in FIG. 1.

Reference now should be made to FIG. 2, for an understanding of the manner of the operation of the circuit of FIG. 1 in a typical situation. Assume that a calling party has dialed the telephone number connected to the line 10, to which the system of FIG. 1 is connected. A ringing signal is detected by the ring detector 11 to enable the micro-processor 15 for operation. The ringing signal also is broadcast through the monitoring loudspeaker 25; so that the called party is aware that an incoming call is being attempted. The called party then depresses a key 32 on the keypad 30. This initiates the "first message activation" indicated in FIG. 2 at point 40, and causes the microprocessor 15 to interface with the digital voice and signal storage memory 16 to select the first response message. This response message is shown in Waveform A of FIG. 2 as "Hello, ... ABC Company ... May I help you?"

Because this first response message ends in a question, and most initial response messages will end in a question, a response from the calling party is expected. Since there is no microphone to pick up any background sounds in the system of FIG. 1, the termination of the message portion A could leave the line 10 with a very flat or "dead" sound level on it during the time the response from the calling party is expected. Consequently, in the preferred embodiment of the system, a second "background noise" response signal B is generated from the signal storage unit 16, and supplied to the line 10. This second response signal is continuously reproduced by appropriate cycling algorithms to provide a realistic background for the receiver at the calling party end of the communication during the time the calling party is responding to the first response message question. Both this background noise portion B and the calling party response are supplied through the amplifier 24 to the loudspeaker 25, to permit the called party to monitor the calling party's response.

At the conclusion of the calling party response, a second one of the push buttons 32 is activated by the called party, to generate a second response message. In the example shown in FIG. 2, this second response message C comprises two words: "Please hold". Once again, the system follows this second voice response with an automatic continuously re-cycling pattern. This is shown in FIG. 2 as the ring-back pattern D at the termination of the synthesized voice message of Waveform C. The pattern D continues until the called party picks up the telephone receiver of the second phone (not shown, but described above) connected to the line 10 to engage in a normal conversation with a calling party. This activates the secondary off-hook detector 35, as described previously, to disable the telephone operator simulator system through deactivation of the microprocessor 15.

During the initial set-up phase of operation of the system, the memory 16 is provided with digital storage of synthesized voice phrases and sounds. These may be implemented as removable, nonvolatile, solid-state memory cards. All of the tones and sound effects which are illustrated in FIG. 2 are generated using the digital patterns which are stored in the memory 16. A microprocessor 15, which transfers the data from the memory 16 to the digital to analog decoder 18, typically operates at the rate of one byte every 250 microseconds, with an appropriate interrupt routine.

The system which has been described has considerable flexibility. For example, the phrases which may be generated from the memory by operation of the keypad 32 are uniquely selected to fit the office or home in which the system is used. In addition, because the system is a telephone operator simulator system, the voice which is used for the response messages may be selected from a variety of frequency synthesized speakers, and simulated speaker attitudes. For example, the response messages may be in voice simulations of a cheerful secretary or a no-nonsense attendant, they may include regional accents, and obviously, may be either male or female voices.

An important feature of the system which is disclosed, is the complete programmability of the digital voice and signal storage memory 16. This is readily accomplished by the use of "memory cards" comparable to the video game cards which are highly popular today. The voices initially may be recorded by a professional speaker. The phrases then are synthesized, and digitally recorded in the appropriate memory locations, for access from the address keys 32 on the keypad 30. Similarly, the background sounds, such as used in portions B and D of the sequence shown in FIG. 2, are selected from any number of sounds which are desired by the particular user of the system.

The system is particularly useful in private homes, and for businesses which are operated out of private homes. For example, women living alone may want to have a male voice answering the phone, and putting the caller on hold until the woman answers the phone. The calling party has no idea whatsoever that the "male" initially answering the phone is not an actual person.

Since the system does not include a microphone to pick up background sounds, the user has the ability to control otherwise distracting background sounds during the time the system is operating in the mode controlled by the microprocessor 15. For example, at any time during the sequence which is illustrated in FIG. 2, a blaring television set may be turned off, children may be encouraged to be quiet, or the like. The called party does not need to go "on line" until the background noise has been controlled. Since the system continues the ring-back or hold mode shown in portion D of the signal sequence of FIG. 2, the called party also may move to a different room from the location of the telephone operator simulator system, where it may be more quiet, before picking up or going "off-hook" with the second phone.

Because of the ability to utilize any voice simulation desired, regional accents can be used. For example, a "British butler" synthesized message may be employed as Messages "A" and "C", in the sequence shown in FIG. 2, for a system located in an area where this would be an unusual accent. The system also is very effective, since perfect enunciation of the message segments, such as "A" and "C" of FIG. 2, can be accomplished, even if the called party is not capable of such enunciation.

The foregoing description of the preferred embodiment of the invention is to be considered as illustrative, and not as limiting. Various changes and modifications will occur to those skilled in the art, without departing from the true scope of the invention, as defined in the appended claims.

I claim:

1. A telephone operator simulator system at a called party location for interfacing with incoming calls on a telephone line, including in combination:
    storage means for storing at lest first and second predetermined response messages;
    control means coupled with said storage means, and with said telephone line for delivering said predetermined response messages from said storage means to said telephone line;
    ring detector means coupled with said telephone line for enabling said control means for operation;
    manually operated selection means coupled with said control means for supplying selection signals to said control means enabled by said ring detector means to cause said control means to produce a first "off-hook" condition on said telephone line and to deliver selected response messages from said storage means to said telephone line after said first "off-hook" condition has been produced;

means coupled to said telephone line for monitoring incoming messages and response messages appearing on said telephone line; and second detector means coupled with said telephone line for disabling said control means in response to a second "off-hook" condition occurring on said telephone line to prevent further supply of response messages from said storage means to said telephone line in response to detection of predetermined line electrical variations, whereby normal voice conversation between a called party and a calling party thereafter may take place on said telephone line.

2. A system according to claim 1 wherein said monitoring means comprises a loudspeaker.

3. The combination according to claim 2 wherein said control means comprises a microprocessor; said storage means comprises a digital storage of synthesized voice phrases and sounds located in a read-only memory (ROM); and said manually operated selection means comprises a keypad having a plurality of keys, each of which is encoded to supply different predetermined addresses to said memory for causing said selected response messages to be supplied from said memory to said microprocessor.

4. A system according to claim 3 wherein said storage means stores at least first and second voice response messages, and further stores non-voice sound patterns; and said control means causes predetermined non-voice sound patterns to be supplied from said storage means to said telephone line following the predetermined voice response messages.

5. The combination according to claim 4 wherein said non-voice response messages comprise a plurality of non-voice response messages, with predetermined different ones of said non-voice response messages automatically being supplied from said storage means by said control means following the selection of different predetermined voice response messages by operation of said selection means.

6. The combination according to claim 1 wherein said control means comprises a microprocessor; said storage means comprises a digital storage of synthesized voice phrases and sounds located in a read-only memory (ROM); and said manually operated selection means comprises a keypad having a plurality of keys, each of which is encoded to supply different predetermined addresses to said memory for causing said selected response messages to be supplied from said memory to said microprocessor.

7. A system according to claim 1 wherein said storage means stores at least first and second voice response messages, and further stores non-voice sound patterns; and said control means causes predetermined non-voice sound patterns to be supplied from said storage means to said telephone line following the predetermined voice response messages.

8. The combination according to claim 7 wherein said non-voice response messages comprise a plurality of non-voice response messages, with predetermined different ones of said non-voice response messages automatically being supplied from said storage means by said control means following the selection of different predetermined voice response messages by operation of said selection means.

* * * * *